(12) United States Patent
Coleman

(10) Patent No.: US 6,205,320 B1
(45) Date of Patent: Mar. 20, 2001

(54) SYSTEM FOR SATELLITE TO AIRSHIP TO GATEWAY/CUSTOMER PREMISE EQUIPMENT, AND AIRSHIP TO AIRSHIP, HIGH DATA RATE RELAY

(76) Inventor: Richard Coleman, 529 - 14$^{th}$ St., NW., Suite 1055, Washington, DC (US) 20045

( * ) Notice: Subject to any disclaimer, the term of this patent is extended or adjusted under 35 U.S.C. 154(b) by 0 days.

(21) Appl. No.: 09/146,776

(22) Filed: Sep. 4, 1998

(51) Int. Cl.$^7$ .................................................. H04B 7/185
(52) U.S. Cl. .............................................. 455/13.1; 455/427
(58) Field of Search .................................... 455/427, 428, 455/430, 431, 9, 10, 12.1, 13.1, 20, 22, 504; 342/352, 353

(56) References Cited

U.S. PATENT DOCUMENTS 5,555,444 * 9/1996 Diekelman et al. ................. 455/12.1
5,615,407 * 3/1997 Barkats .................................. 455/20

* cited by examiner

*Primary Examiner*—Reinhard J. Eisenzopf
*Assistant Examiner*—Marsha D. Banks-Harold
(74) *Attorney, Agent, or Firm*—Oblon, Spivak, McClelland, Maier & Neustadt, P.C.

(57) ABSTRACT

A system is disclosed for transmitting data from satellites to unmanned or manned air vehicles (U/MAVs), and then from U/MAVs to Gateway/customer premise equipment (Gateway/CPE). Conversely, the system transmits data from the Gateway/CPEs to the U/MAVs, and then from the U/MAVs to satellites. The transmission between the satellites and U/MAVs involves optical or high frequency microwaves, and the transmission between the U/MAVs and the Gateway/CPEs occurs at lower microwave frequencies. A converting unit within the U/MAVs convert the data between the optical and higher microwave frequencies and the lower microwave frequencies. In another embodiment, data is crosslinked by transmitting it from a first U/MAV to other U/MAVs.

7 Claims, 2 Drawing Sheets

SYSTEM FOR SATELLITE TO AIRSHIP TO GATEWAY/CUSTOMER PREMISE EQUIPMENT, AND AIRSHIP TO AIRSHIP, HIGH DATA RATE RELAY

FIELD OF THE INVENTION

The present invention relates to the transfer and/or relay of data at high rates, and in particular, the transfer and/or relay of data at high rates between satellites, airships, and Gateway/Customer Premise Equipment.

BACKGROUND OF THE INVENTION

Satellites are used for the collection and transfer of data in connection with communications, navigation and/or surveillance. Such data usually originates from a transmitting device on the surface of the earth, however, satellites can also collect data from the atmosphere and space via sensors installed aboard the satellite. The data received by a satellite is normally transmitted to a receiving unit on the surface of the earth, or it is relayed to another satellite or satellites before it is transmitted to a receiving unit on the earth's surface.

Satellites normally transfer data to stations on the earth's surface through microwaves. While satellites are capable of transmitting data at optical frequencies (i.e. lasers), satellite transmissions to earth stations at optical or laser frequencies would not be practical because the transmission would suffer an unacceptable attenuation during passage through the earth's atmosphere.

Unmanned or manned air vehicles (U/MAVs), such as airships, also have been used in the past to receive and relay communications, power, and other transmissions from stations located on the surface of the earth to other earth-based receiving stations or U/MAVs (See e.g. U.S. Pat. Nos. 3,742,358 and 5,348,254).

While satellites, airships or U/MAVs, and earth stations have been used to relay or transfer data, such systems have relied either on satellites or airships, and have not combined into one system satellites, U/MAVs and earth-based stations.

It is consequently an object of the present invention to construct a system to transfer and/or relay data at very high rates from a satellite or satellites to an unmanned or manned air vehicle or vehicles (U/MAVs), and then from the U/MAV (s) to a Gateway/Customer Premise Equipment (Gateway/CPE).

It is another object of the present invention to construct a system to transfer and/or relay data at very high rates from one or more Gateway/CPEs on the surface of the earth to one or more U/MAVs, and then from the U/MAV(s) to one or more satellites.

It is another object of the present invention to increase overall data throughput between satellites and Gateway/CPEs.

It is still another object of the present invention to enhance the capabilities of satellites to transmit data at optical frequencies.

It is yet another object of the present invention to construct a system to transfer and/or relay data at very high rates from one U/MAV to other U/MAVs.

SUMMARY OF THE INVENTION

The present invention relates to a novel system which transfers communications, data and other information at high rates of speed. The system consists of one or more transceiving satellites (i.e. capable of both receiving and transmitting information), one or more unmanned or manned air vehicles (U/MAVs) featuring a transceiver frequency converter system, and one or more transceiving units of Gateway/Customer Premise Equipment (Gateway/CPEs). The satellites may be low earth orbit satellites, medium earth orbit satellites, high altitude elliptical satellites, and/or geosynchronous earth orbit satellites. The satellite is capable of transmitting and receiving information at optical and higher microwave frequencies, the U/MAV is capable of transmitting and receiving information at optical, higher microwave, and lower microwave frequencies, and the Gateway/CPE is capable of transmitting and receiving information at lower microwave frequencies. The U/MAV may be powered by an onboard fuel supply, a transmission of microwave energy from a microwave transmitting unit, solar cells, a combination of the foregoing, or other power systems.

Data transmission can originate in any one of four ways. First, Gateway/CPEs can transmit data to satellites. Second, satellites can transmit data to U/MAVs. Third, Gateway/CPEs can transmit data to U/MAVs. Lastly, U/MAVs can initiate transmissions to either satellites or Gateway/CPEs. Such transmitted data includes, but is not limited to, video and voice data, remotely sensed data, television signals, and telescopic data.

The underlying principal of the system is that the U/MAV's payload up-converts (changes to a higher frequency) signals which are being transmitted away from the earth's atmosphere, and conversely down-converts (changes to a lower frequency) signals which are being transmitted towards the earth's atmosphere. Thus, optical or higher microwave signals going to the U/MAV from satellites (whether the signal originated directly from the satellites or Gateway/CPEs) would be down-converted by the U/MAV's high speed, onboard data switch, router, frequency converter or other similar device before being relayed to Gateway/CPEs. On the other hand, lower microwave signals going to the U/MAV from Gateway/CPEs would be up-converted by the U/MAV's payload, and then relayed to one or more satellites. Typically, data is simultaneously transmitted both from a Gateway/CPE through a U/MAV to a satellite, and from a satellite through a U/MAV to a Gateway/CPE, with both up and down-converting occurring simultaneously.

The U/MAV may also be used for up/down-converting in a configuration where data is sent from Gateway/CPEs to a U/MAV, the data is up-converted, crosslinked to another U/MAV (either the first or a subsequent U/MAV could do the up-conversion), and sent to one or more satellites. The data transmission can also travel from satellites to crosslinked U/MAVs and then to Gateway/CPEs. As disclosed in the previous paragraph, such transmissions can occur simultaneously, and such a system may involve two or more U/MAVs.

Additionally, the invention allows communications to go from a first Gateway/CPE to a first U/MAV, and then to a first satellite. The transmission can then be relayed from the first satellite to a second satellite, then to a second U/MAV and finally to a second Gateway/CPE. More generally, any multiple combinations of Gateway/CPEs, U/MAVs and satellites can be combined to transmit data.

The primary advantage of the aforementioned system is that overall data throughput is increased by allowing satellites to transmit at the more efficient optical frequencies. The U/MAV receives these optical transmissions before they are attenuated by the earth's atmosphere, converts the transmission to a lower microwave frequency which is not as adversely affected by the earth's atmosphere as higher frequencies, and then transmits the converted data to Gateway/CPEs.

The U/MAV payload up-converts and down-converts signals on a relative basis, i.e. what might be considered a higher frequency requiring down-conversion in one instance may be considered a lower frequency requiring up-conversion in another instance. Typically, for example, the U/MAV payload would up-convert signals transmitted from Gateway/CPEs in the 1–51 gigahertz (GHz) range to higher optical frequencies, and would down-convert signals transmitted from satellites at optical frequencies to the 1–51 GHz range. However, the U/MAV could receive signals from Gateway/CPEs at 1 GHz, and up-convert to 47 GHz (microwave frequency) before transmission to satellites. Conversely, the U/MAV could receive signals from satellites at 47 GHz, and down-convert it to 1 GHz before transmission to Gateway/CPEs.

DETAILED DESCRIPTION OF THE PREFERRED EMBODIMENTS

Figure 1:
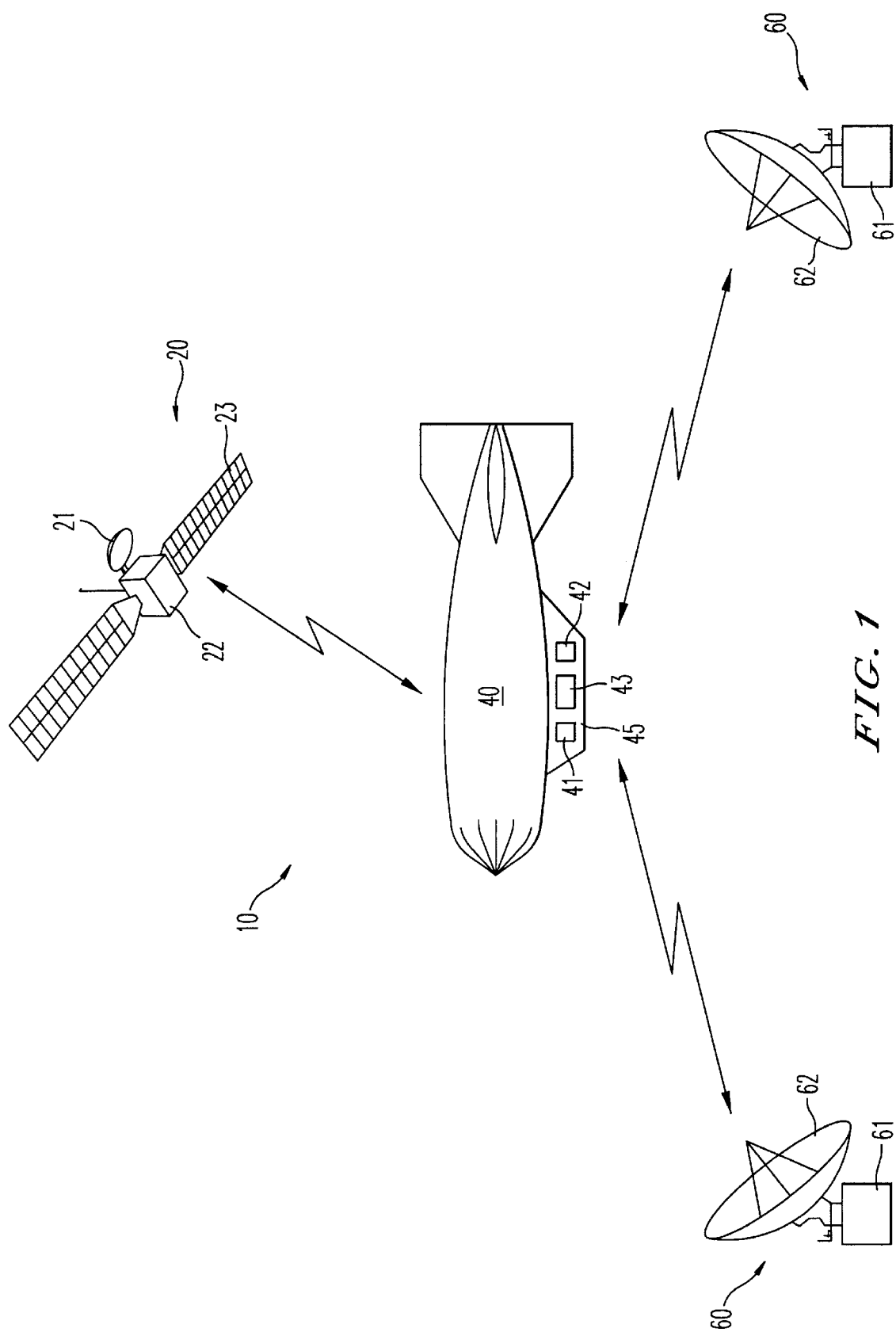
FIG. 1 illustrates the data transfer system of the present invention.

The system of the present invention is depicted in general by the number 10 in FIG. 1.

The system 10 consists of at least one satellite 20, at least one unmanned or manned air vehicle 40 (U/MAV), and at least one unit of Gateway/Customer Premise Equipment 60 (Gateway/CPE). The satellite 20 is typical of those in the art which can be used for communications, surveillance, and/or navigation, and consists in part of a transceiving antenna 21 (i.e. a transmitting/receiving antenna), a sensor 22, and solar panels 23. The satellite 20 may be a low earth orbit satellite, a medium earth orbit satellite, a high altitude elliptical satellite, and/or a geosynchronous earth orbit satellite. The transceiving antenna 21 may be embodied in one unit as depicted in FIG. 1, or it may be two separate antennas. The sensor 22 may be one for gathering photographic data, weather-related data, or some other type of data. The solar panels 23 collect energy from the sun to power the systems and subsystems of the satellite 20.

The U/MAV 40 is preferably one that can remain aloft for indefinite periods of time via an onboard power supply and a means of replenishing that power supply without returning to the earth. Such a system is described in U.S. patent application Ser. No. 08/976,311, which is hereby incorporated by reference. The U/MAV 40 has incorporated therein a transceiver frequency converter system 45 featuring a receiving antenna 41 for receiving transmissions from the satellite 20, and a multifrequency transmitting antenna 42 to transmit microwave transmissions to the Gateway/CPE 60. The receiving antenna 41 may also receive data from the Gateway/CPE 60, and the transmitting antenna 42 may also transmit data to the satellite 20. In another embodiment, the antennas 41 and 42 of the transceiver frequency converter system may be embodied in a single antenna. The transceiver frequency receiver system also has a converting unit 43, which, as is well known in the art, converts the optical or microwave frequencies received from the satellite 20 to lower frequency microwaves before transmission to Gateway/CPE 60. If the data is being transmitted from the Gateway/CPE 60 to the satellite 20 via the U/MAV 40, the converting unit 43 converts the lower frequency microwave transmissions from the Gateway/CPE 60 to higher microwave frequencies or optical frequencies. Gateway/CPE 60 consists of a supporting base 61 and a transceiving dish 62.

The system 10 functions as follows. Satellite 20 receives data input from a remote source via its transceiving antenna 21 or its sensing device 22. The satellite 20 processes the received data and converts it into data of optical or higher microwave frequencies, and transmits the data via its transceiving antenna 21 to multifrequency receiving antenna 41 on the U/MAV 40. Converting unit 43 converts the optical or higher frequency microwave transmission from satellite 20 to a lower microwave frequency. Typically, converting unit 43 converts the received transmission to a range of 1–51 GHz. The U/MAV 40 then beams the converted microwave frequency data via its multifrequency transmitting antenna 42 to Gateway/CPE 60, which receives the data through its transceiving dish 62.

The system 10 transmits communications and other data more efficiently than a conventional satellite to earth communications system. As alluded to earlier, a satellite to earth communication system would be most efficient if the satellite could transmit to the earth at optical frequencies. Unfortunately, optical or higher frequency microwave transmissions from a satellite to the earth will become attenuated by the earth's atmosphere. Consequently, such transmissions are not practical. However, a satellite can transmit data to a high altitude U/MAV at optical frequencies or high microwave frequencies, thereby benefiting from the transmission of data at optical frequency. The U/MAV then converts the transmission to lower microwave frequencies for transmission down to the earth.

The system 10 also functions by transmitting data from the Gateway/CPE 60, to the U/MAV 40, and then to the satellite 20. For such a transmission, the Gateway/CPE 60 transmits data via its transceiving dish 62 at microwave frequencies. The U/MAV 40 receives these microwave transmissions via its receiving antenna 41, converts the transmissions to optical or higher microwave frequencies with its converting unit 43, and then transmits the data via its transmission antenna 42 at these optical or higher microwave frequencies to the satellite 20. The satellite 20 receives the transmission with its transceiving antenna 21.

When the system 10 communicates among satellites 20, U/MAVs 40, and Gateway/CPEs 60, different satellites, U/MAVs and/or Gateway/CPEs can be used in a transmission that is beamed towards the earth's atmosphere than was used in the communication beamed away from the earth's atmosphere, thereby creating a new communication path. Similarly, in a transmission that is beamed away from the earth's atmosphere, different satellites, U/MAVs and Gateway/CPEs can be used than were used in the transmission towards the earth's atmosphere.

Figure 2:
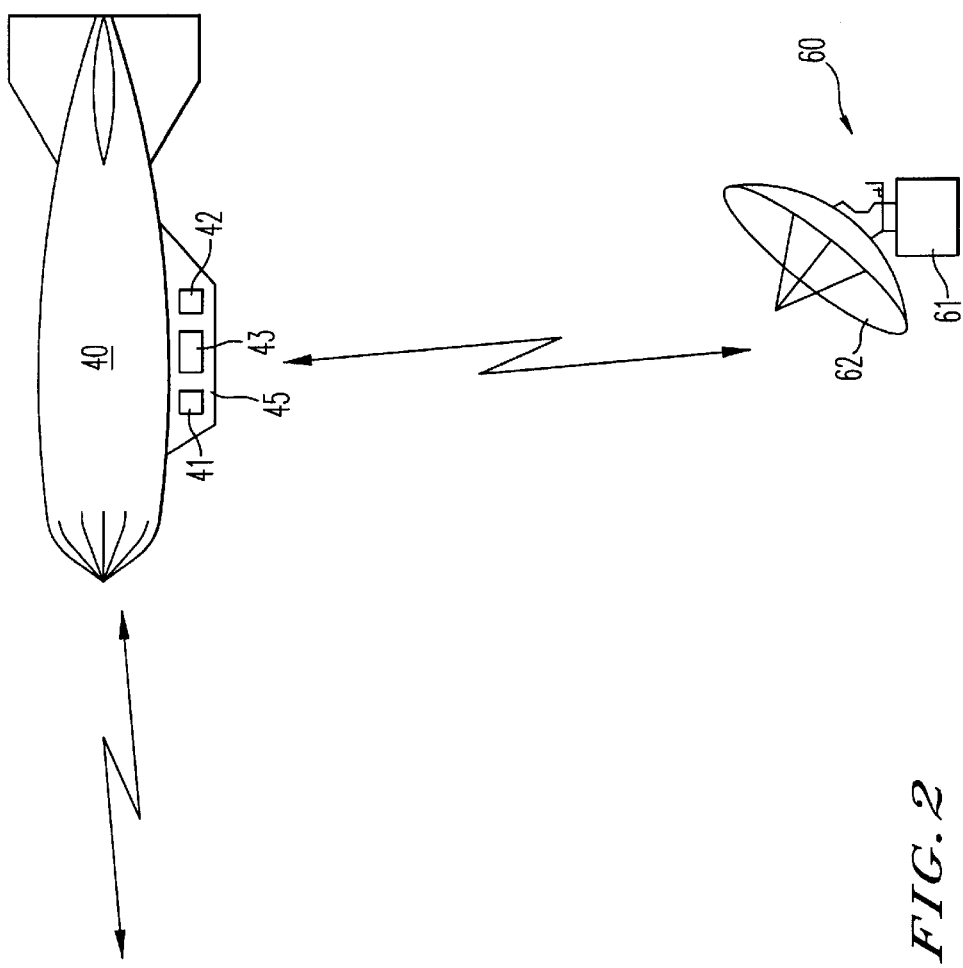
FIG. 2 illustrates another embodiment of the data transfer system of the present invention which involves crosslinking between U/MAVs.
Figure 2:
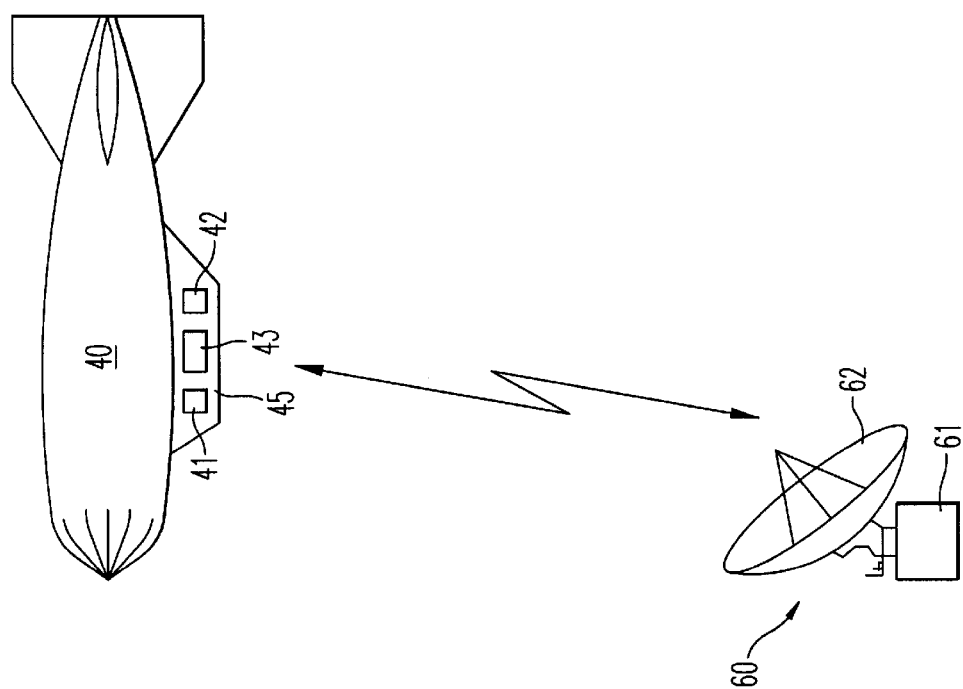

The system 10 is also designed to enable high data rate communications between U/MAVs 40. For example, as illustrated in FIG. 2, a Gateway/CPE 60 could send a signal to a first U/MAV, which uses its transceiver frequency converter system to first up-convert the signal, and then the U/MAV can crosslink the signal to a second U/MAV. The second U/MAV down-converts the signal and subsequently transmits it to a distant Gateway/CPE 60. Similarly, a signal could be sent from a satellite 20 to two or more U/MAVs, and then to a Gateway/CPE 60.

It will be appreciated by those skilled in the art and it is contemplated that variations to the embodiments illustrated and described herein may be made without departing from the spirit and scope of the present invention. Accordingly, it is intended that the foregoing description is illustrative only, and that the true spirit and scope of the invention will be determined by the appended claims.

I claim:

1. A system for transmitting communications and other data comprising:
   one or more satellites, said satellites transmitting data at optical or microwave frequencies;
   one or more unmanned or manned air vehicles;
   a transceiver frequency converter system located on said unmanned or manned air vehicles, said transceiver frequency converter system comprising
      multifrequency receiving antennas, said multifrequency receiving antennas to receive said data from said satellites,
      converting units, said converting units to convert said data to lower frequencies,
      and multifrequency transmitting antennas, said multifrequency transmitting antennas to transmit said data converted to lower frequencies; and
   one or more units of transceiving Gateway/customer premise equipment, said units of transceiving Gateway/customer premise equipment for receiving said data transmitted from said multifrequency transmitting antennas.

2. The system for transmitting communications and other data according to claim 1,
   wherein said units of transceiving Gateway/customer premise equipment transmit data to said unmanned or manned air vehicles at microwave frequencies;
   wherein said multifrequency receiving antennas of said unmanned or manned air vehicles receive said data from said units of transceiving Gateway/customer premise equipment;
   wherein said converting units of said unmanned or unmanned air vehicles convert said data to optical or higher microwave frequencies; and
   wherein said multifrequency transmitting antennas transmit said data to said satellites.

3. The system for transmitting communications and other data according to claim 1, wherein said converting unit of said unmanned or manned air vehicles converts said data received from said satellites to a frequency range of 1 to 51 gigahertz.

4. The system for transmitting communications and other data according to claim 1, wherein said unmanned or manned air vehicles further comprise replenishable onboard fuel systems allowing said unmanned or manned air vehicles to remain aloft for indefinite periods of time, said onboard fuel systems replenishable by transmission of microwave energy from other sources.

5. A method for transmitting communications and other data comprising the steps of:
   transmitting data at optical or higher microwave frequencies from one or more satellites to one or more unmanned or manned air vehicles;
   receiving said data from said satellites via multifrequency receiving antennas on said unmanned or manned air vehicles;
   converting said data to lower frequencies with converting units on said unmanned or manned air vehicles; and
   transmitting said data via multifrequency transmitting antennas on said unmanned or manned air vehicles to one or more units of transceiving Gateway/customer premise equipment.

6. A method for transmitting communications and other data according to claim 5, further comprising the steps of:
   transmitting data at microwave frequencies from one or more units of Gateway/customer premise equipment to one or more unmanned or manned air vehicles;
   receiving said data from said units of Gateway/customer premise equipment via multifrequency receiving antennas on said unmanned or manned air vehicles;
   converting said data to higher microwave frequencies or optical frequencies with converting units on said unmanned or manned air vehicles; and
   transmitting said data via multifrequency transmitting antennas on said unmanned or unmanned air vehicles to one or more satellites.

7. A method for transmitting communications and other data according to claim 5, further comprising the steps of:
   transmitting said data from said unmanned or manned air vehicle to a second unmanned or manned air vehicle; and
   transmitting said data from said second unmanned or manned air vehicle to said satellite or said Gateway/customer premise equipment.

* * * * *